United States Patent [19]

McCartney et al.

[11] 4,152,492
[45] May 1, 1979

[54] WATER COOLED BIPOLAR BATTERY APPARATUS

[75] Inventors: Joseph F. McCartney, Solana Beach; William H. Shipman, La Mesa, both of Calif.;

[73] Assignee: The United States of America as represented by the Secretary of the Navy, Washington, D.C.

[21] Appl. No.: 929,395

[22] Filed: Jul. 31, 1978

[51] Int. Cl.² .................................................. H01M 6/38
[52] U.S. Cl. .................................. 429/116; 429/118; 429/157; 429/210
[58] Field of Search ............... 429/116, 118, 119, 152, 429/157, 159, 194, 210; 114/20 R, 20 A

[56] References Cited

U.S. PATENT DOCUMENTS

| | | | |
|---|---|---|---|
| 2,953,111 | 9/1960 | Jones | 114/20 R |
| 3,897,264 | 7/1975 | Auborn | 429/199 X |
| 3,907,593 | 9/1975 | Marincic | 429/196 |
| 3,922,174 | 11/1975 | Heller | 429/218 X |
| 3,929,507 | 12/1975 | Bro et al. | 429/116 |
| 3,930,885 | 1/1976 | Dey | 429/116 |
| 3,966,497 | 6/1976 | Honer | 429/119 |
| 4,031,296 | 6/1977 | Sarbacher et al. | 429/116 |

Primary Examiner—Anthony Skapars
Attorney, Agent, or Firm—Richard S. Sciascia; Ervin F. Johnston

[57] ABSTRACT

A battery apparatus is provided which includes a plurality of modules which are mounted end-to-end in a stacked pile configuration. Each module contains a plurality of bipolar electrodes. One end of each module has a flexible bladder for storing an electrolyte. The bladders in a collapsed condition provide spacing between the modules for cooling. Each module has a passageway for communicating electrolyte from the bladder to the bipolar electrodes. A device seals each passageway from the respective bladder in one mode of operation and is actuated by pressure on the bladder to open the passageway in another mode of operation. With this arrangement pressure on the bladders will distribute electrolyte into each module and the bladders will collapse to provide a cooling space between the modules.

21 Claims, 8 Drawing Figures

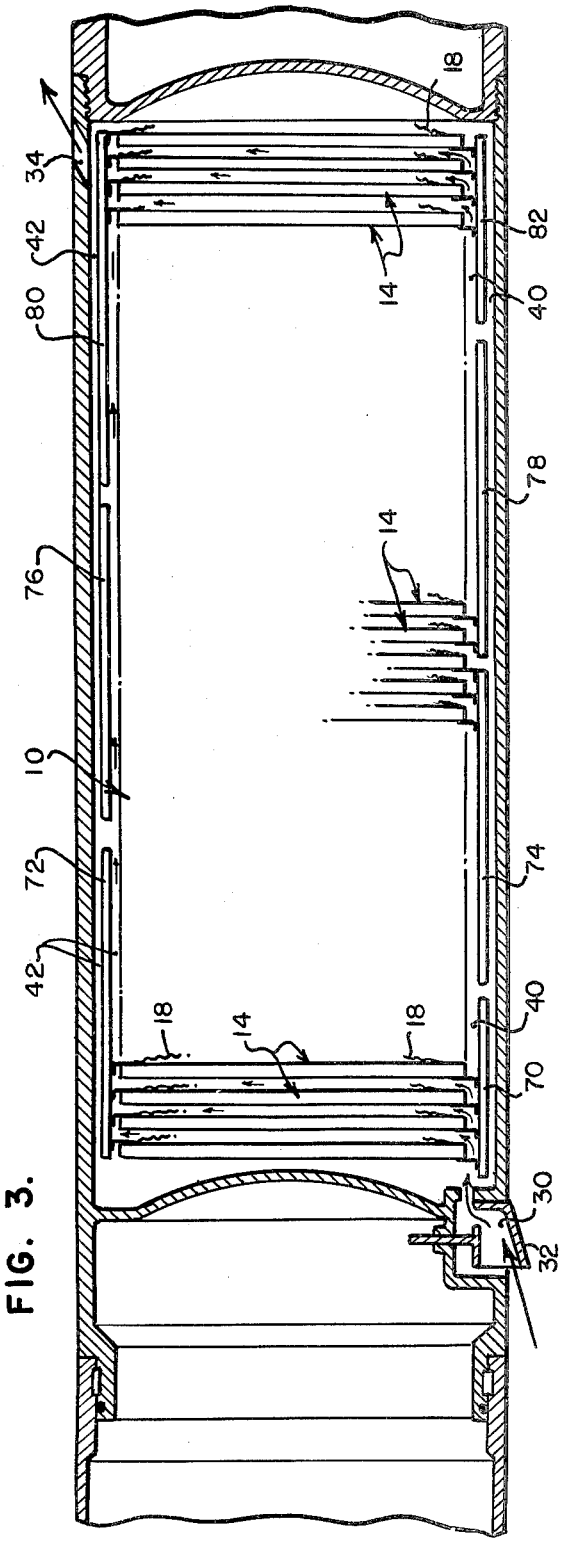
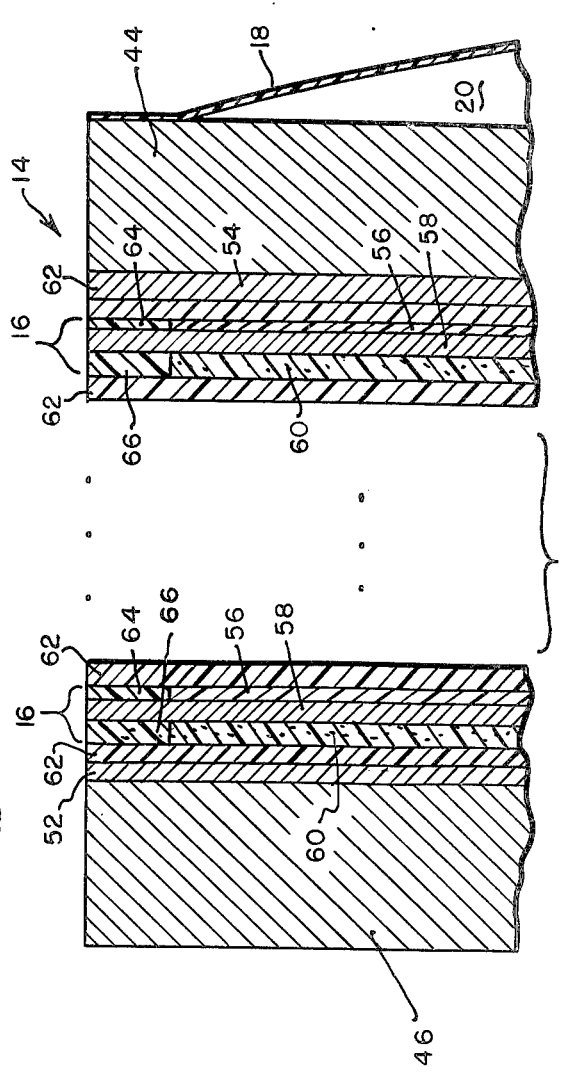
FIG. 3.
FIG. 4.

WATER COOLED BIPOLAR BATTERY APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The bipolar electrode battery is a very efficient and high-energy density type of battery. However, because of the great internal resistance there is a considerable amount of heat generated which must be dissipated in order to maintain the integrity and efficiency of the battery. The Navy has many applications which require high-energy density batteries. One such example is a torpedo which contains the batteries in a section for operating an electric motor which in turn powers a propeller shaft. Other examples of such battery users are water and land vehicles, and oceanographic instrumentation.

SUMMARY OF THE INVENTION

The present invention has provided a bipolar battery with a unique water cooling arrangement which ensures efficient peak performance of the battery apparatus. This has been accomplished by providing a plurality of modules which are mounted end-to-end in a stacked pile configuration. Each module contains a plurality of bipolar electrodes. One end of each module has a flexible bladder for storing an electrolyte. The bladders in a collapsed condition provide spacing between the modules for cooling. Each module has a passageway for communicating electrolyte from the bladder to the bipolar electrodes. A device is provided for sealing each passageway from the respective bladder in one mode of operation and is actuated by pressure on the bladder to open the passageway in another mode of operation. With this arrangement pressure on the bladders will distribute electrolyte into each module and the bladders will collapse to provide a cooling space between the modules.

OBJECTS OF THE INVENTION

An object of the present invention is to provide a bipolar battery apparatus which has a more efficient water cooling arrangement.

Another object of the invention is to provide a bipolar reserve electrolyte battery in which the space taken by the reserve electrolyte is utilized for cooling passages after the electrolyte is disseminated to the battery apparatus.

A further object is to provide a more efficient bipolar battery.

These and other objects of the invention will become more readily apparent from the ensuing specification taken together with the drawings.

DESCRIPTION OF THE DRAWINGS

FIG. 3 is a view similar to FIG. 2 except the battery apparatus has been actuated.

FIG. 4 is an enlarged vertical cross-sectional view through one of the battery modules and the bipolar electrodes therein.

DESCRIPTION OF THE PREFERRED EMBODIMENTS

Figure 1:
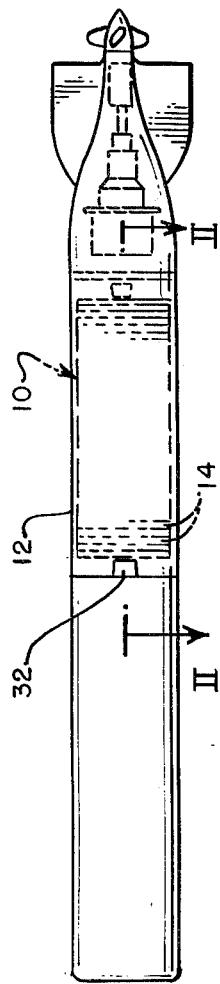
FIG. 1 is a side view of the battery apparatus mounted in an exemplary embodiment, namely a torpedo.
Figure 2:
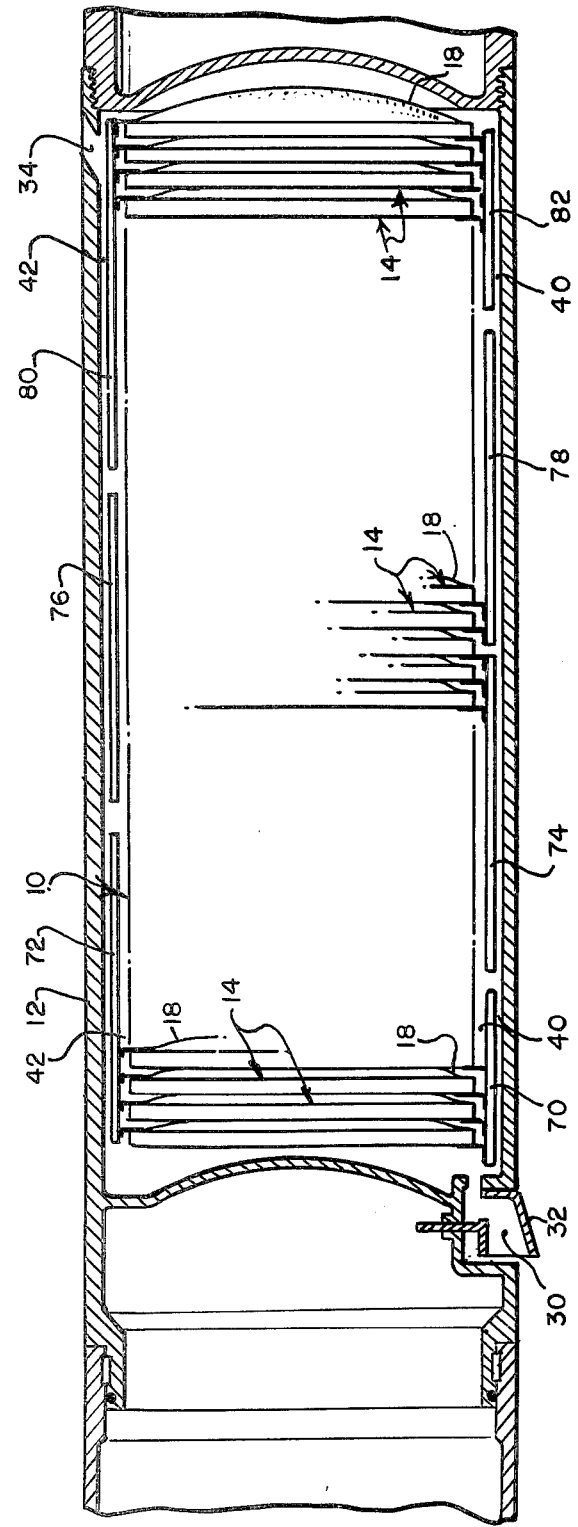
FIG. 2 is a longitudinal cross-sectional view of a portion of the torpedo taken along plane II—II of FIG. 1 with the battery apparatus shown prior to actuation.

Referring now to the drawings wherein like reference numeral designate like or similar parts throughout the several views there is illustrated in FIG. 1 a battery apparatus 10 which may be mounted in a casing, such as an intermediate cylindrical casing portion 12 of a torpedo. The battery apparatus may include a plurality of modules 14 which are mounted end-to-end in a stacked pile configuration. As illustrated in FIG. 4, each module contains a plurality of bipolar electrodes 16. One end of each module has a flexible bladder 18 for storing an electrolyte 20. As illustrated in FIG. 2, it is preferred that each bladder 20 directly engage an adjacent module 14 when the bladder is filled with the electrolyte. When the bladders 20 are in a collapsed condition, as illustrated in FIG. 3, a space is provided between each pair of modules 14 for cooling purposes which will be explained in more detail hereinbelow.

Each module 14 has passageway means 22, 24 and 26 for communicating the electrolyte 20 from the bladder 18 to the bipolar electrodes 16. The passageway means will be described in more detail hereinbelow.

Means 28 is provided for sealing each passageway means of the module from the respective bladder 18 in one mode of operation (as illustrated in FIG. 2, and which is actuated by pressure on the bladder 18 to open the passageway means of the module in another mode of operation (as illustrated in FIG. 3). The sealing means 28 will be described in more detail hereinafter.

As illustrated in FIG. 2, the cylindrical casing portion 12 of the torpedo may be provided with an inlet 30 and a scoop 32 at a forward end of the modules 14 and with an outlet 34 at an aft end.

Figure 6:
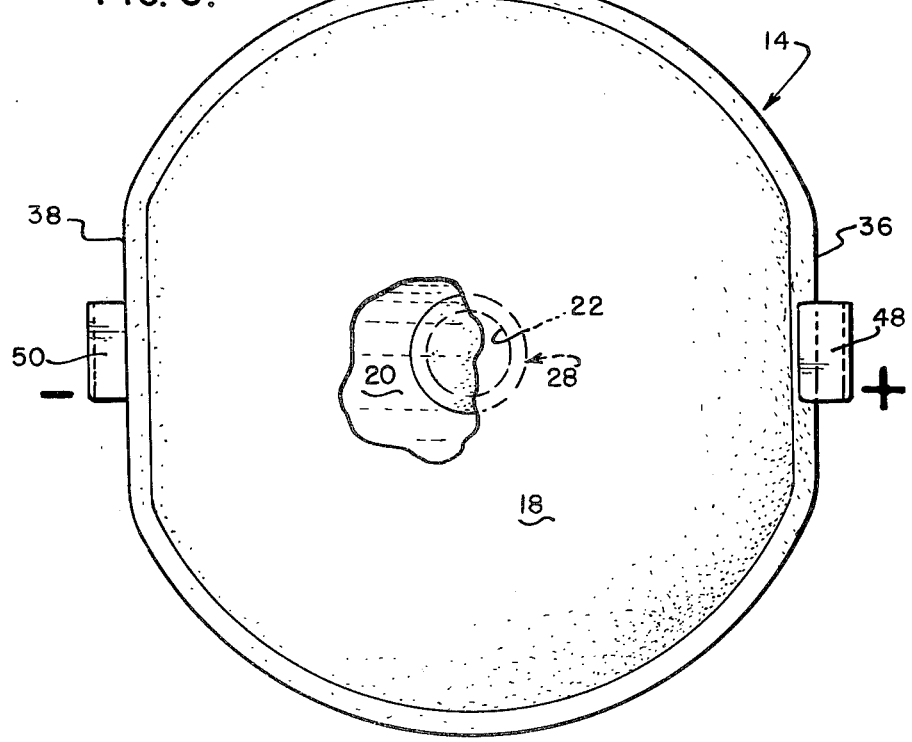
FIG. 6 is an enlarged end view of one of the battery modules.

As illustrated in FIG. 6, each battery module 14 is generally cylindrical with oppositely located cord sections 36 and 38 which, as illustrated in FIG. 2, provide bottom and top passageways 40 and 42 between the modules 14 and the interior cylindrical surface of the torpedo casing section 12. The passageways 40 and 42 interconnect the casing inlet 30 and the casing outlet 34 via the spaces between the modules 14 after collapse of the bladders 18, as illustrated in FIG. 3.

With the arrangement described hereinabove the battery apparatus 10 will operate in response to sea pressure or any other applied pressure in the exemplary torpedo casing 12. When the torpedo opens the scoop 32 and sufficient pressure is obtained, the bladders 18 of the battery apparatus will collapse, as illustrated in FIG. 3. This will cause sea water to flow into the passageway 40 and between the modules after collapse of the bladders 18, thence along the passageway 42 to the outlet 34. The sea water will cool the battery modules 14 so as to keep them at peak performance during their operational life. It is to be understood that the torpedo casing section 12 is merely exemplary. The battery modules 14 may be mounted in any suitable casing for many other purposes such as operating oceanographic instrumentation or land vehicles. The cooling media may be liquid or gas.

Figure 5:
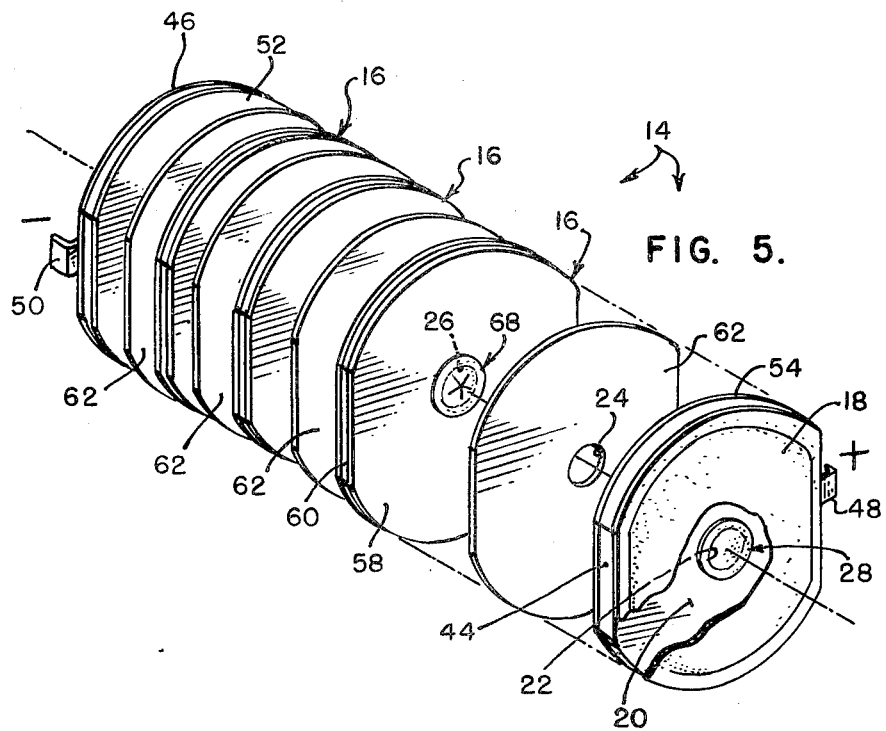
FIG. 5 is an exploded isometric view of one of the battery modules.

Referring now to FIG. 5, the battery module 14 is described in more detail. The module may include a pair of end plates 44 and 46 with the bipolar electrodes 16 disposed therebetween. Each of the end plates 44 and 46 may be provided with a respective terminal 48 and 50. An inner side of one of the end plates, such as end plate 46, is coated with a cathode material 52, and an inner side of the other plate, such as end plate 44, is coated with an anode material 54. The end plate 44 may be provided with the central aperture 22 which is part of the passageway means referred to hereinabove. The flexible bladder 18, which may be constructed of thin Teflon or metal foil, may be bonded at its peripheral edge to the exterior of the plate 44 so as to encompass the passageway 22. The passageway sealing and opening means 28, referred to hereinabove, may be a rupturable membrane. The rupturable membrane 28, which may be a thin circular piece of Teflon or metal foil, may be bonded at its peripheral edges over the passageway 22. Accordingly, when the pressure on the bladder 18 containing the electrolyte 20 is sufficient enough the membrane 28 will rupture to allow the electrolyte to enter through the passageway 22 into the interior of the module 14. The rupture strength of the membrane 28 is obviously less than the rupture strength of the bladder 18.

As shown in FIG. 6, each bipolar electrode 16 may include a substrate 56 with an anode material 58 deposited on one side thereof and a cathode material 60 deposited on the other side thereof. Between each bipolar electrode 16 is a separator 62. As shown in FIG. 5, each separator 62 is provided with an aperture 24 and the components of each bipolar electrode 16 are provided with apertures 26 to provide for the passageway means referred to hereinabove.

As shown in FIG. 4, it is desirable that the substrate 56 extend beyond the anode and cathode material 58 and 60 and that washer-like separators 64 and 66 of insulator material be provided for sealing both sides of each bipolar electrode to respective separator plates 62. This arrangement will substantially eliminate leakage currents across the periphery between the anode and cathode of each bipolar electrode 16.

To further eliminate leakage currents between the anode and cathode of each bipolar electrode 16, valve means 68 may be mounted in the aperture 26 of each bipolar electrode 16, as illustrated in FIG. 5, for transferring electrolyte under pressure in a direction away from the bladder 18, and then closing the aperture 26 after cessation of the pressure to prevent leakage currents.

Figure 8:
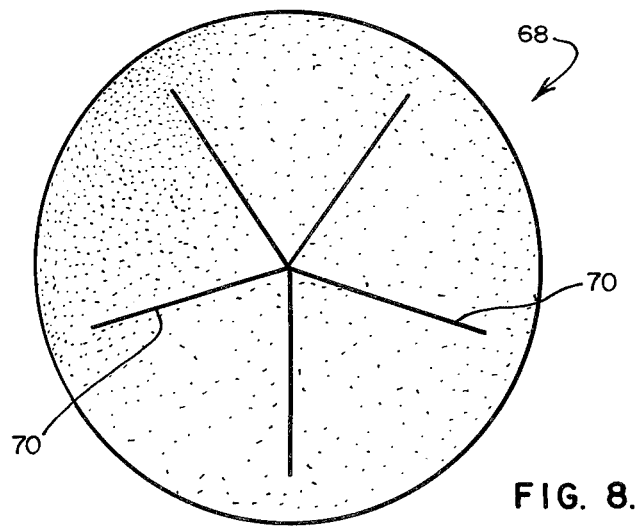
FIG. 8 is an end view of an exemplary valve arrangement in each respective bipolar electrode.

As illustrated in FIG. 8, the valve means 68 may be a circular membrane which is provided with a plurality of radially extending slits 70 which extend from the center of the membrane outwardly to points just short of the outer periphery thereof. The membrane 68, which may be constructed from Teflon, is resilient so that when there is an imbalance of pressure on opposite sides of the membrane the slits 70 will allow the membrane to open to pass a fluid and relieve this pressure. Once the pressure is relieved the membrane will return to its closed position to substantially eliminate any leakage currents between anode and cathode materials of each bipolar electrodes 16.

In a preferred embodiment of the present invention the anode materials 52 and 58 are lithium, the cathode materials 54 and 60 are porous carbon, and the electrolyte 20 is lithium tetrachloraluminate in a liquid carrier of thionyl chloride. Each bipolar electrode 16 may include a five mil nickel substrate 56 with 2.5 mil lithium 58 and 5 mil porous carbon 60 bonded thereon. The separators 62 may be polyethylene sheet material, 5 mils in thickness. The end plates 44 and 46 may be 40 mils of aluminum with copper and nickel flashed on the outer end and inner surfaces thereof respectively. The porous carbon cathodes 60 will absorb and distribute the electrolyte 20 when the latter has entered into the module 14.

Under ordinary circumstances the entrance of the electrolyte 20 into each module 14 will cause the entrapment of gas, such as air, therein. It has been found that by filling the module with sulfur dioxide prior to the entrance of the electrolyte 20 therein so that there is no entrapment of any gas within the modules. The reason for this is that the thionyl chloride carrier of the electrolyte 20 absorbs the sulfur dioxide so that no gas is left remaining after the electrolyte enters into the module. With this arrangement significantly increased performance is obtained from each of the battery modules 14.

Figure 7:
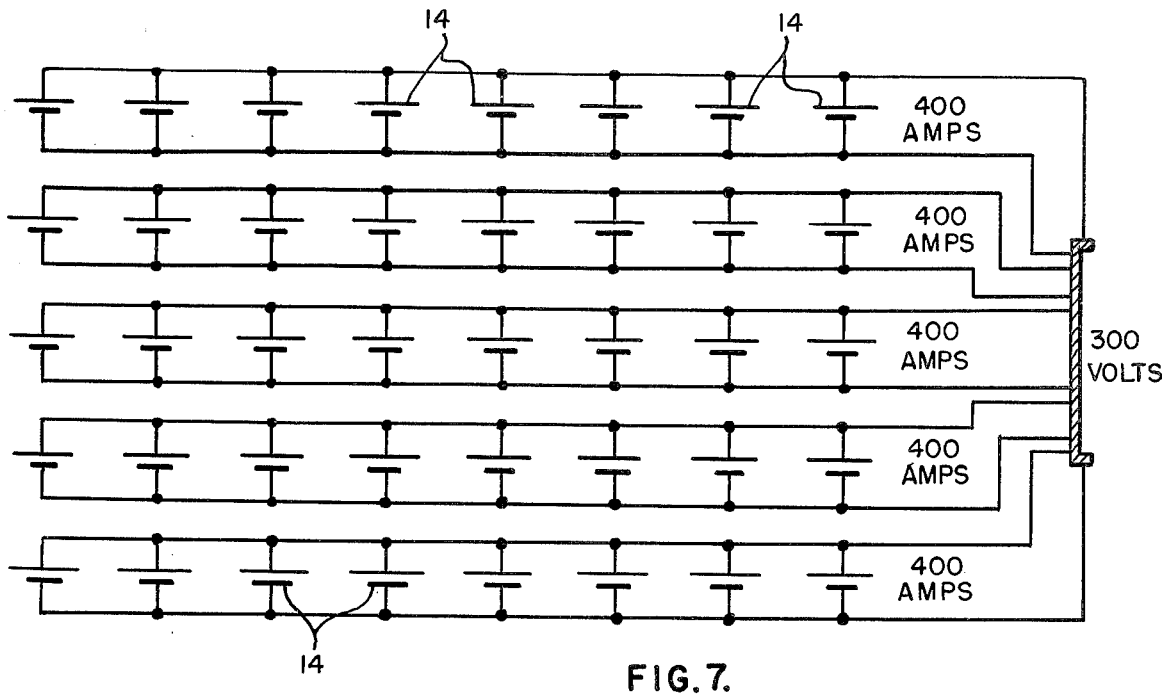
FIG. 7 is an exemplary schematic illustration of the electrical connection of the battery modules.

In an exemplary embodiment of the present invention 22 bipolar electrodes 16 may be disposed between the end plates 44 and 46, as illustrated in FIG. 5. With the arrangement as described hereinabove the capabilities of each battery module 16 will be five amps at 60 volts. As illustrated in FIG. 7, a total of 40 modules 14 may be utilized to provide a power output of 400 amps at 300 volts. This may be accomplished by busing five sets of eight modules 14 in parallel and connecting each set in series. A practical means of obtaining such an electrical hookup is illustrated in FIG. 2. The hookup may be accomplished by busbars 70, 72, 74, 76, 78, 80 and 82 which are connected to plus and minus module terminals 48 and 50 (see FIG. 6). Busbar 70 and half of busbar 72 may connect a total of eight battery modules 14 in parallel while the remaining half of busbar 72 and half of the busbar 74 connect another set of eight battery modules 14 in parallel as well as connecting the two parallel sets in series via the busbar 72. Alternate sets of battery modules 14 are reversed in their positions so that the polarity of the terminals 48 and 50 likewise alternate to place the sets and modules in series. For instance, if the positive terminals 48 of the set of modules are electrically connected to the busbar 70 and the correspondingly negative terminals 50 are connected to the half of the busbar 72, then the next set of modules will have their positive terminals 48 connected into the remaining half of the busbar 72 and the negative terminals 50 connected into the half of the busbar 74. The same logic is followed in the remainder of the busbars in order to obtain electrical hookup as illustrated in FIG. 6.

OPERATION OF THE INVENTION

In the operation of the exemplary embodiment of the present invention the torpedo may be placed into the water via an aircraft or from a torpedo tube of a submarine. When the scoop 32 is opened, sea water is allowed to enter into the torpedo casing and into the bottom passageway 40. When the sea pressure has reached a sufficient degree, the membranes 28 will rupture causing the electrolyte 20 within the bladders 18 to enter into each module via the passageways 22, 24 and 26. The electrolyte 20 will be absorbed within the porous cathodes 60 thereby activating each battery module 14. The sulfur dioxide gas within each module will be absorbed by the thionyl chloride carrier of the electrolyte 20 so as to eliminate entrapment of any gas. The valve 68 within each bipolar electrode 16 will open only to let the electrolyte in under pressure and then will close to prevent leakage currents between the anode and cathode of each bipolar electrode. The power from the battery apparatus 10 may then be utilized to operate a torpedo motor which will in turn rotate a propeller.

Obviously, many modifications and variations of the present invention are possible in the light of the above teachings, and, it is therefore understood that within the scope of the disclosed invention concept, the invention may be practiced otherwise than as specifically described.

What is claimed is:

1. A battery apparatus comprising:
   a plurality of modules which are mounted end to end in a stacked pile configuration;
   each module containing a plurality of bipolar electrodes;
   one end of each module having a flexible bladder for storing an electrolyte, the bladders in a collapsed condition providing spacing between the modules for cooling;
   each module having passageway means for communicating electrolyte from the bladder to the bipolar electrodes; and
   means sealing each passageway means from the respective bladder in one mode of operation and actuated by pressure on the bladder to open the passageway means in another mode of operation,
   whereby pressure on the bladders will distribute electrolyte into each module and the bladders will collapse to provide a cooling space between the modules.

2. A battery as claimed in claim 1 including:
   the module containing sulfur dioxide.

3. A battery as claimed in claim 1 including:
   the passageway means comprising each bipolar electrode having a central aperture; and
   valve means disposed in each aperture for transferring electrolyte under pressure in a direction away from a respective bladder and then closing the aperture to leakage currents.

4. A battery as claimed in claim 1 including:
   the bladder of at least one of the modules directly engaging an adjacent module when the bladder is filled with electrolyte.

5. An apparatus as claimed in claim 1 including:
   a casing;
   the modules being mounted in the casing;
   the casing having an ambient fluid inlet and scoop at one end of the modules and an ambient fluid outlet at an opposite end of the modules; and
   the casing inlet and outlets communicating with the exterior of the battery modules;
   whereby, after collapse of the bladders, ambient fluid can circulate past the modules for cooling purposes.

6. An apparatus as claimed in claim 5 including:
   the casing being cylindrical; and
   the battery modules being cylindrical with the exception of oppositely located chord sections which provide passageways for interconnecting said casing inlet and outlet via the spaces between the modules after collapse of the bladders.

7. A battery as claimed in claim 1 including:
   the passageway means comprising the bipolar electrodes having central coextensive apertures.

8. A battery as claimed in claim 1 including:
   the passageway sealing and opening means being a rupturable membrane.

9. A battery as claimed in claim 1 wherein each bipolar electrode includes:
   a substrate;
   an anode material deposited on one side of the substrate; and
   a porous cathode material deposited on the other side of the substrate.

10. A battery as claimed in claim 1 including:
    a pair of end plates;
    the bipolar electrodes being disposed between the end plates;
    each of the end plates having a terminal;
    an inner side of one of the end plates being coated with a cathode material and an inner side of the other end plate being coated with an anode material;
    one of the end plates having a central aperture which is part of said passageway means; and
    the flexible bladder being mounted on the exterior of the latter plate about the central aperture.

11. A battery as claimed in claim 10 including:
    the module containing sulfur dioxide.

12. A battery as claimed in claim 11 including:
    the bladder of at least one of the modules directly engaging an adjacent module when the bladder is filled with electrolyte.

13. A battery as claimed in claim 12 including:
    a casing;
    the modules being mounted in the casing;
    the casing having an ambient fluid inlet and scoop at one end of the modules and an ambient fluid outlet at an opposite end of the modules; and
    the casing inlet and outlets communicating with the exterior of the battery modules;
    whereby, after collapse of the bladders ambient fluid can circulate past the modules for cooling purposes.

14. An apparatus as claimed in claim 13 including:
    the casing being cylindrical; and
    the battery modules being cylindrical with the exception of oppositely located chord sections which provide passageways for interconnecting said casing inlet and outlet via the spaces between the modules after collapse of the bladders.

15. An apparatus as claimed in claim 14 including:
    the passageway means comprising each bipolar electrode having a central aperture; and
    valve means disposed in each aperture for transferring electrolyte under pressure in a direction away from a respective bladder and then closing the aperture to leakage currents.

16. An apparatus as claimed in claim 15 including:
    the passageway sealing and opening means being a rupturable membrane.

17. An apparatus as claimed in claim 16 wherein each bipolar electrode includes:
    a substrate;

an anode material deposited on one side of the substrate; and a porous cathode material deposited on the other side of the substrate.

18. An apparatus as claimed in claim 17 including:

the anode materials being lithium;

the cathode materials being porous carbon; and an electrolyte of lithium tetrachloraluminate in thionyl chloride disposed within the bladders.

19. A battery comprising:

anode and cathode elements;

means providing a cavity for containing the anode and cathode elements;

said cavity having space for an electrolyte in a thionyl chloride carrier; and said cavity being filled with sulfur dioxide;

whereby upon filling the space with the electrolyte in said carrier the sulfur dioxide is contained in solution to minimize gas voids within the electrolyte space.

20. A battery comprising:

a casing;

a plurality of bipolar electrodes mounted in the casing;

said electrodes having apertures for the passage of electrolyte;

valve means mounted in the apertures for transfering electrolyte under pressure across the valve, but closing when the pressure across the valve is balanced;

a bladder, responsive to ambient pressure, mounted on the exterior of the casing for containing an electrolyte; and said casing having an opening adjacent the bladder for communicating the electrolyte to the electrodes through said apertures.

21. A battery as claimed in claim 20 including:

a rupturable membrane mounted in the casing opening.

* * * * *